United States Patent [19]

Sullivan

[11] 3,867,166

[45] Feb. 18, 1975

[54] COATED METAL ARTICLE AND METHOD OF MAKING THE SAME

[75] Inventor: James D. Sullivan, Delafield, Wis.

[73] Assignee: Tycon, S.p.A., Venice, Italy

[22] Filed: July 10, 1972

[21] Appl. No.: 270,528

Related U.S. Application Data

[63] Continuation-in-part of Ser. No. 794,403, Jan. 27, 1969, abandoned.

[52] U.S. Cl............ 117/23, 65/33, 106/39.6, 106/48, 117/40, 117/129, 117/135.1, 117/169 A
[51] Int. Cl............................................. B32b 15/00
[58] Field of Search.......... 117/135.1, 129, 705 C, 117/705 B, 169 A, 23, 70 A, 70 R, 40; 106/48, 52, 39.7, 39.6, 39 DV; 65/33; 161/196

[56] References Cited
UNITED STATES PATENTS

| 3,184,320 | 5/1965 | Michael | 106/48 |
| 3,361,588 | 1/1968 | Scharbach et al. | 117/129 |
| 3,368,712 | 2/1968 | Sanford et al. | 117/129 |
| 3,458,301 | 7/1969 | Kroyer et al. | 117/23 |
| 3,462,252 | 8/1969 | Veres | 106/39.6 |
| 3,507,687 | 4/1970 | Laird | 117/129 |
| 3,560,327 | 2/1971 | Mills | 117/70 A |

Primary Examiner—Charles E. Van Horn
Assistant Examiner—Michael W. Ball
Attorney, Agent, or Firm—Andrus, Sceales, Starke & Sawall

[57] ABSTRACT

A method of producing a mixed crystalline-glass coated metal article. A devitrifiable glass frit is initially heat treated to devitrify the frit and produce an amorphous glass matrix containing a multiplicity of devitrified silicate crystals. The devitrified frit is subsequently milled with a corrosion resistant glass frit and the mixture is applied to the metal article. The coated metal article is fired at an elevated temperature to fuse the glass to the metal, and during the firing, the amorphous glass matrix tends to dissolve in the corrosion resistant glass frit. The resulting coating, which is a mixture of glass and crystalline particles, has a high impact resistance and toughness as well as having excellent resistant to corrosive attack.

12 Claims, No Drawings

COATED METAL ARTICLE AND METHOD OF MAKING THE SAME

This application is a continuation-in-part of application Ser. No. 794,403, filed Jan. 27, 1969 now abandoned, and entitled Coated Metal Article and Method of Making the Same.

BACKGROUND OF THE INVENTION

Glass or vitreous enamel coatings are frequently applied to metal articles, such as steel, to prevent corrosion of the metal base. In the normal glass coating procedure the glass frit, along with a mill addition, is applied to the surface of the steel in the form of a slip or slurry. After drying of the slip, the coated article is heated or fired at an elevated temperature, generally in the range of 1,500°F to 1,800°F to fuse the glass.

Silica is the major constituent in most common glasses and when the glass coated article is exposed in service to highly corrosive media, a high silica content, in the range of 70 to 85%, is desired because the silica increases the resistance of the glass to chemical attack.

It is also recognized that a devitrified glass has good impact and shock resistance, as well as toughness, but, in general, devitrified glass lacks corrosion resistance due to the fact that the devitrified particles are composed primarily of silica and the amorphous glass matrix, being depleted in silica, has a low resistance to corrosive attack.

In the past, it has been proposed to combine a high-silica corrosion resistance glass frit with a devitrifiable glass frit in an attempt to produce a glass coating having good impact resistance along with good corrosion resistance. In a process of this type, the common procedure has been to mill the corrosion resistant glass frit and the devitrifiable glass frit together and apply the mixed frit to the metal article. After firing of the coated article to fuse the glass, the glass coated article is then subject to a further heat treatment at a temperature beneath the firing temperature to develop the devitrified particles. As a result of this final heat treatment, a three-phase system is produced consisting of (i) the amorphous glass matrix of the devitrifiable glass which is then depleted of silica by removal of the devitrified particles, (ii) the devitrified particles, and (iii) the corrosion resistant glass. As the amorphous glass matrix, which is depleted of silica, has poor corrosion resistance, this provides a weak link in the corrosion resistance of the coating.

It has also been proposed in the past to separately coat the metal article with both a devitrifiable glass and a corrosion resistant glass. In U.S. Pat. No. 3,361,588, a process of this type is disclosed in which the steel is initially coated with a devitrifiable glass which is subsequently devitrified by heat treatment. Following this, a corrosion resistant glass frit is applied to the devitrified glass and subsequently fired. However, a process of that type requires two separate heat treatments of the metal article or vessel which increases the overall cost of the process.

U.S. Pat. No. 3,507,687 discloses a method of coating a metal base with a glass composition having a low residual compressive stress to increase the resistance of the glass coating to radii spalling on relatively sharp edges. In U.S. Pat. No. 3,507,687, particles of crystobilite are added to the glass composition and due to the sharp temperature inversion exhibited by crystobilite on cooling, the glass has a relatively low residual compressive stress of about 7,500 psi, thereby increasing the radii spall resistance of the glass.

SUMMARY OF THE INVENTION

The present invention is directed to a method of coating a metal article on which the resulting crystalline-glass coating not only has improved impact resistance and toughness but also has excellent resistance to corrosive attack. According to the invention, a devitrifiable glass frit is initially dry milled and subsequently heat treated at an elevated temperature and for a sufficient period of time to substantially fully devitrify the frit. The devitrification results in the development of minute silicate crystals in a matrix of amorphous glass. Following the devitrification, the devitrified frit is wet milled with a conventional corrosion resistant glass frit containing a high percentage of silica. The milled slurry is applied to the metal article and after drying, the article is fired at an elevated temperature for a period of time sufficient to fuse the glass.

The resulting glass coating has excellent corrosion resistance, as well as improved thermal shock resistance and toughness, and has particular use as a coating for chemical procrssing equipment or other articles which may be exposed in service to corrosive media.

DESCRIPTION OF THE PREFERRED EMBODIMENT

The devitrifiable frit is a conventional glass frit capable of devitrifying during heat treatment. The devitrifiable frit may have the following formulation in weight percent:

| | |
|---|---|
| $Li_2O$ | 1 – 25% |
| $Al_2O_3$ | 0 – 30% |
| $SiO_2$ | 60 – 80% |
| $Na_2O$ | 0 – 5% |
| $MgO$ | 0 – 5% |
| $CeO_2$ | 0 – 10% |
| $TiO_2$ | 0 – 5% |
| $ZrO_2$ | 0 – 5% |
| $PbO$ | 0 – 5% |
| $CaO$ | 0 – 10% |

Specific examples of frits capable of devitrifying and falling within the above range of composition are as follows in weight percent:

| | 1 | 2 | 3 |
|---|---|---|---|
| $Li_2O$ | 15.0 | 1.5 | 8.0 |
| $Al_2O_3$ | 25.0 | — | 2.0 |
| $SiO_2$ | 60.0 | 75.0 | 75.0 |
| $Na_2O$ | — | 5.0 | — |
| $MgO$ | — | 3.0 | 3.0 |
| $CeO_2$ | — | 8.5 | — |
| $TiO_2$ | — | — | 3.0 |
| $ZrO_2$ | — | 3.0 | — |
| $PbO$ | — | 4.0 | — |
| $CaO$ | — | — | 9.0 |

The devitrifiable frit is initially dry milled by conventional milling equipment. The particle size of the milled frit is not critical, but is generally less than 35 mesh.

Following the milling, the frit is heated to an elevated temperature for a period of time sufficient to substantially fully devitrify the frit. The specific temperatures and times involved in the devitrification depend on the composition of the frit, but generally the temperatures will be in the range of 1,000°F to 1,600°F and the time employed at this temperature is usually in the range of 1 to 2 hours. During this heat treatment, silicate particles crystalize out of the amorphous glass matrix. It is desired to crystalize or devitrify the full devitrifiable portion of the frit, and in most cases, the crystals, after devitrification, comprise at least 50%, and in most cases from 60% to 85%, by weight of the devitrified frit.

The devitrified crystals have a size less than 10 microns and in most instances have a particle size in the range of 0.1 to 2.0 microns.

It is believed that the devitrified silicate particles are basically composed of $Li_2O$-$Al_2O_3$-$SiO_2$ and/or $MgO$-$Al_2O_3$-$SiO_2$. It is important that the devitrifiable frit be a type which will not form crystobalite on devitrification for crystobalite particles will exhibit a sharp temperature inversion on cooling which will result in a relatively low residual compressive stress in the glass. On the other hand, the devitrified silicate particles will not exhibit a temperature inversion on cooling. As the glass coating has particular application in coating large surfaces of chemical vessel or processing equipment, it is desired that the glass have a residual compressive stress of about 8,000 psi or greater and the formation of crystobalite particles would tend to reduce the residual compressive stress beneath that limit.

Following the devitrification, the devitrified frit is wet milled with a corrosion resistant glass frit and a mill addition. The corrosion resistant glass frit may have the following formulation in weight percent:

| | |
|---|---|
| $SiO_2$ | 63 – 80% |
| $TiO_2$ | 0 – 2% |
| $ZrO_2$ | 0 – 8% |
| $CaO$ | 0 – 2% |
| $Li_2O$ | 1 – 5% |
| $Na_2O$ | 8 – 17% |
| $K_2O$ | 0 – 7% |
| $MgO$ | 0 – 2% |
| $F_2$ | 0 – 3% |
| $CoO$ | 0 – 1.25% |
| $MnO$ | 0 – 1.50% |
| $NiO$ | 0 – 1.50% |

Specific examples of corrosion resistant frits falling within the above range of composition are as follows in weight percent:

| | 1 | 2 | 3 |
|---|---|---|---|
| $SiO_2$ | 72.5 | 73.5 | 75.0 |
| $TiO_2$ | 1.0 | — | — |
| $ZrO_2$ | 4.0 | 5.5 | 4.5 |
| $CaO$ | 1.0 | 2.0 | 1.5 |
| $Li_2O$ | 2.5 | 3.0 | 3.0 |
| $Na_2O$ | 13.5 | 14.0 | 12.5 |
| $K_2O$ | 2.0 | — | 1.0 |
| $MgO$ | 1.0 | — | 1.0 |
| $F_2$ | — | 2.0 | — |
| $CoO$ | 0.5 | — | 0.5 |
| $MnO$ | 1.0 | — | 0.5 |
| $NiO$ | 1.0 | — | 0.5 |

In most cases the corrosion resistant glass frit is a non-devitrifiable frit, but this is not essential, and the corrosion resistant frit may devitrify to some extent. Even if the corrosion resistant frit is capable of devitrifying, it will not devitrify during the firing period because the metal article is not held at the firing temperature for a sufficient period of time to enable a devitrifiable corrosion resistant frit to devitrify.

The mill additions which are added to the glass frit are conventional types and may take the form of sodium nitrate, bentonite, sodium aluminate, clay, and the like.

The devitrifiable frit comprises up to 60% by weight of the dry frit mixture and preferably from 20% to 50% of the dry mixture.

The devitrified frit and the corrosion resistant glass frit are preferably wet milled as a water suspension. However, in some cases the two frits can be dry milled and subsequently applied to the metal articles as a dry dust coating. The particle size of the milled frit mixture is not critical and follows conventional enamelling techniques. Generally, up to 85% of the milled frit particles will pass through a 200 mesh sieve.

The wet milled frit mixture can be applied to the metal base by any conventional techniques, such as spraying, dipping, slushing, brushing, or the like. After application to the metal base, the coating is dried to evaporate the water.

The metal base can be steel or any other metal having a coefficient of thermal expansion similar to steel. More specifically, the metal base can be carbon steel such as SAE 1010-1030, stainless steel, Inconel, Hastalloy C–276, and the like.

The glass coated metal base is fired at a temperature in the range of 1,400°F to 1,700°F, and usual in the range of 1,500°F to 1,600°F, for a period of about 5 to 15 minutes to fuse the glass to the metal. During the firing, the amorphous glass matrix of the devitrified frit will tend to dissolve in the corrosion resistant glass so that the silica-depleted amorphous glass matrix is substantially eliminated in the resulting glass coating. After firing, the coating is composed of devitrified silicate crystals and a blend of the corrosion resistant glass and the glass matrix of the devitrified frit. As the glass matrix of the devitrified frit is not present as a separate phase in the final product, the corrosion resistance of the glass coating is substantially improved, and yet the presence of the devitrified silicate particles improves the thermal shock resistance as well as the toughness of the glass coating.

Devitrifying the devitrifiable glass frit prior to applying the frit to the metal article enables a wider range of heat treatment to be employed in the devitrification operation. If the frit was to be devitrified on the metal article after firing, the range of heat treatment would be limited, for it is not feasible to heat treat some metal parts for long periods without warpage.

A further disadvantage of prior art processes in which devitrification was carried on after application of the glass to the metal article or vessel is that some portions of the vessel will heat differently than other portions with the result that varying degrees of devitrification in the glass will be obtained, thereby resulting in varying physical properties in the glass coating. This problem is eliminated with the invention, for the frit is devitrified in bulk before being applied to the vessel, so that the vessel is not subjected to the prolonged devitrification heat treatment.

By subjecting the frit in bulk to the devitrification heat treatment, it is also possible to use more refractory frit compositions containing higher proportions of silica and having higher devitrification temperatures. High refractory compositions cannot be used if the devitrification is carried on after the frit is applied to the vessel, for prolonged heating at the high devitrifying temperature may adversely effect the physical properties of the vessel.

Specific examples of the process of the invention are as follows:

EXAMPLE NO. 1

A devitrifiable frit was prepared having the following composition in weight percent:

| | |
|---|---|
| $Li_2O$ | 8.0 |
| $Al_2O_3$ | 2.0 |
| $SiO_2$ | 75.0 |
| MgO | 3.0 |
| $TiO_2$ | 3.0 |
| CaO | 9.0 |

The frit was milled and heated in bulk to a temperature of 1,350°F and held at this temperature for a period of one and one-half hours to devitrify the frit. Following devitrification, the frit was air cooled to room temperature.

40 parts of the devitrified frit was milled with 60 parts of a corrosion resistant glass frit, a mill addition, composed of 3 parts clay, 0.2 part of Setit and 0.1 part of sodium aluminate, and 43 parts of water.

The corrosion resistant glass frit had the following composition in weight percent:

| | |
|---|---|
| $SiO_2$ | 72.5 |
| $TiO_2$ | 1.0 |
| $ZrO_2$ | 4.0 |
| CaO | 1.0 |
| $Li_2O$ | 2.5 |
| $Na_2O$ | 13.5 |
| $K_2O$ | 2.0 |
| MgO | 1.0 |
| CoO | 0.5 |
| MnO | 1.0 |
| NiO | 1.0 |

In the wet milling procedure the devitrified frit and mill additions were initially milled for one hour and then the corrosion resistant frit was added and the milling was continued for an additional one and one-half hours. After milling the frit mixture had a particle size such that less than 3% was retained on a 200 mesh sieve.

The milled slip was then sprayed onto the ground coated surface of a low carbon steel plate and dried under infrared lamps.

After drying the coated plate was fired at a temperature of 1,540°F for 9 minutes.

The resulting coated steel plate had good impact and shock resistance as well as excellent corrosion resistance.

EXAMPLE NO. 2.

A devitrifiable frit was prepared having the following composition in weight percent:

| | |
|---|---|
| $Li_2O$ | 8.0 |
| $Al_2O_3$ | 2.0 |
| $SiO_2$ | 75.0 |
| MgO | 3.0 |
| $TiO_2$ | 3.0 |
| CaO | 9.0 |

The frit was miled and heated in bulk to a temperature of 1,550°F and held at this temperature for a period of one and one-half hours to devitrify the frit. Following devitrification, the frit was air cooled to room temperature.

30 parts of the devitrified frit were milled with 70 parts of a corrosion resistant glass frit, a mill addition, composed of 3 parts clay, 0.2 parts of Setit and 0.1 part of sodium aluminate, and 43 parts water.

The corrosion resistant glass frit had the following composition in weight percent:

| | |
|---|---|
| $SiO_2$ | 73.5 |
| $ZrO_2$ | 5.5 |
| CaO | 2.0 |
| $Li_2O$ | 3.0 |
| $Na_2O$ | 14.0 |
| $F_2$ | 2.0 |

In the wet milling procedure the devitrified frit and mill additions were initially milled for one hour and then the corrosion resistant frit was added and the milling was continued for an additional one and one-half hours. After milling, the frit mixture had a particle size such that less than 3% was retained on a 200 mesh sieve.

The milled slip was then sprayed onto the ground coated surface of a low carbon steel plate and dried under infrared lamps.

The resulting crystalline-glass coated steel plate had good impact and shock resistance as well as excellent corrosion resistance.

Various modes of carrying out the invention are contemplated as being within the scope of the following claims particularly pointing out and distinctly claiming the subject matter which is regarded as the invention.

I claim:

1. A composite structure to be subsequently fired at an elevated temperature, comprising a metal base, and a mixed frit composition disposed on a surface of the base, said composition comprising a mixture of (a) a substantially fully devitrified glass frit composed of an amorphous glass matrix and containing a substantial portion of devitrified crystalline silicate particles and being substantially free of crystobalite particles, and (b) a corrosion resistant substantially non-devitrifiable glass frit containing from 63% to 80% by weight of silica, said mixed frit composition being subsequently fired at an elevated temperature to fuse the composition to the metal, said amorphous glass matrix tending to dissolve in said corrosion resistant glass frit during said firing while retaining the identity of the devitrified crystalline particles to provide a resulting crystalline-glass coating having improved abrasion resistance, impact resistance, and toughness and excellent corrosion resistance.

2. The structure of claim 1, wherein said devitrified glass frit comprises up to 60% of said frit composition.

3. The structure of claim 1, wherein said devitrified particles comprise from 50% to 85% by weight of said devitrified glass frit.

4. The structure of claim 1, wherein said metal base is a ferrous metal.

5. The structure of claim 3, wherein said crystalline particles have a size less than 10 microns.

6. A composite structure to be subsequently fired at an elevated temperature, comprising a steel base, and a mixed frit composition disposed on a surface of the base, said composition comprising a mixture of (a) a substantially fully devitrified glass frit composed of an amorphous glass matrix and containing a substantial portion of devitrified crystalline silicate particles, said silicate particles comprising from 50% to 85% by weight of said devitrified glass frit and said devitrified glass frit being free of crystobalite particles, and (b) a corrosion resistant substantially non-devitrifiable glass frit containing from 63% to 80% by weight of silica, said devitrified frit comprising from 20% to 50% by weight of said mixed frit composition and the balance being said corrosion resistant glass frit, said mixed frit composition being subsequently fired at an elevated temperature to fuse the composition to the metal, said amorphous glass matrix tending to dissolve in said corrosion resistant glass frit during said firing while retaining the identity of the devitirifed crystalline particles to provide a resulting crystalline-glass coating having improved abrasion resistance, impact resistance, and toughness and excellent corrosion resistance.

7. A method of coating a metal article, comprising the step of substantially fully devitrifying a devitrifiable glass frit to produce a devitrified frit composed of an amorphous glass matrix and a plurality of devitrified crystalline silicate particles dispersed within said matrix, said devitrified glass being substantially free of crystobalite particles, mixing said devitrified glass frit with a corrosion resistant substantially non-devitrifiable glass frit to provide a mixture, applying said mixture to the metal article as a coating, and firing said article at a temperature sufficiently high to fuse said mixture to said metal article, said amorphous glass matrix tending to dissolve in said corrosion resistant glass frit during firing.

8. A method of coating a metal article, comprising the step of substantially fully devitrifying a devitrifiable glass frit to produce a devitrified frit composed of an amorphous glass matrix and a plurality of devitrified crystalline silicate particles dispersed within said matrix, said devitrified glass frit being substantially free of crystobalite particles, mixing said devitrified glass frit with a corrosion resistant substantially non-devitrifiable glass frit containing from 63% to 80% by weight of silica to provide a mixture, applying said mixture to the metal article, and firing said article at a temperature sufficiently high to fuse said mixture to said metal article, and for a time sufficient to dissolve at least a substantial portion of said amorphous glass matrix in said corrosion resistant glass frit while retaining the identify of the devitrified crystalline particles to provide a strystalline-glass coating.

9. The method of claim 8, wherein said devitrifiable glass frit is devitrified by heating said frit to a temperature ofo 1,000°F to 1,600°F.

10. The method of claim 8, wherein said mixing is accomplished by milling said frits together, the milled mixture having a particle size such that at least 85% of said particles pass through a 200 mesh sieve.

11. The method of claim 8, wherein said metal article is fired at a temperature in the range of 1,400°F to 1,700°F.

12. A method of coating a steel base, comprising the steps of heating a devitrifiable glass frit to a temperature sufficiently high to substantially fully devitrify the frit, the devitirifed frit comprising an amorphous glass matrix having dispersed therein a plurality of devitrified silicate crystals and being substantially free of crystobalite particles, said crystals comprising at least 50% by weight of said devitrified frit, mixing the devitirifed frit with a corrosion resistant substantially non-devitrifiable frit with said devitrified frit comprising up to 60% by weight of the mixture, applying the mixture to the steel base, and firing the steel base at a temperature in the range of 1,400°F to 1,700°F for a period of time sufficient to dissolve at least a substantial portion of said amorphous glass matrix in said corrosion resistant glass while retaining the identity of the devitrified crystalline particles to produce a resulting mixed crystalline-amorphous glass coating having improved abrasion resistance, shock resistance and toughness, and excellent resistance to corrosive attack.

* * * * *